(12) United States Patent
Taira et al.

(10) Patent No.: US 9,366,827 B2
(45) Date of Patent: Jun. 14, 2016

(54) OPTICAL CONNECTOR ASSEMBLY AND OPTICAL CONNECTOR ADAPTER WITH SHUTTER

(71) Applicant: SEIKOH GIKEN CO., LTD., Chiba (JP)

(72) Inventors: Junji Taira, Chiba (JP); Masayuki Jibiki, Chiba (JP); Yohei Takaishi, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 0 days.

(21) Appl. No.: 14/841,009

(22) Filed: Aug. 31, 2015

(65) Prior Publication Data
US 2016/0062051 A1    Mar. 3, 2016

(30) Foreign Application Priority Data

Sep. 2, 2014  (JP) ................................. 2014-177983
Sep. 2, 2014  (JP) ................................. 2014-177984
Jun. 2, 2015  (JP) ................................. 2015-111993

(51) Int. Cl.
*G02B 6/38* (2006.01)

(52) U.S. Cl.
CPC ............ *G02B 6/3825* (2013.01); *G02B 6/3813* (2013.01); *G02B 6/3814* (2013.01); *G02B 6/3849* (2013.01); *G02B 6/3865* (2013.01); *G02B 6/3893* (2013.01)

(58) Field of Classification Search
CPC .. G02B 6/3825; G02B 6/3813; G02B 6/3814; G02B 6/3849; G02B 6/3865; G02B 6/3893
USPC ............................................. 385/56, 139, 73
See application file for complete search history.

(56) References Cited

U.S. PATENT DOCUMENTS

| 4,666,242 | A  | * | 5/1987  | Cairns ................. | G02B 6/3816 385/69 |
| 5,179,610 | A  | * | 1/1993  | Milburn ............... | G02B 6/3813 385/147 |
| 7,144,163 | B2 | * | 12/2006 | Tanaka ................. | G02B 6/3825 385/55 |
| 7,708,474 | B2 | * | 5/2010  | Sheau Tung Wong ................... | G02B 6/3878 385/53 |
| 7,841,778 | B2 | * | 11/2010 | Nishimura ........... | G02B 6/3839 385/53 |
| 8,491,198 | B2 | * | 7/2013  | Lin ....................... | G02B 6/3849 385/75 |

(Continued)

FOREIGN PATENT DOCUMENTS

| CN | 102645710 A | 8/2012 |
| JP | 2012-37542 A | 2/2012 |

(Continued)

*Primary Examiner* — Ryan Lepisto
*Assistant Examiner* — Guy Anderson
(74) *Attorney, Agent, or Firm* — Kenealy Vaidya LLP

(57) ABSTRACT

An optical connector assembly and an optical connector adapter with a shutter each provide better heat radiation performance by blocking light outputted from a first optical fiber held by a first optical connector plug with a shutter thereby controlling temperature of an adapter body of the optical connector adapter not to exceed a prescribed level even when light having optical high power is outputted from the first optical fiber for about 15 minutes. An countermeasure against the light having optical high power is provided in a side wall of one of first and second receiving holes to be irradiated with the light outputted from the first optical fiber toward the second receiving hole and reflected thereafter by the shutter plate disposed in one of the first and second receiving holes.

15 Claims, 12 Drawing Sheets

(56) References Cited

U.S. PATENT DOCUMENTS

| | | | | |
|---|---|---|---|---|
| 8,636,422 B2* | 1/2014 | Kahle | ............... | G02B 6/3825 385/53 |
| 8,870,466 B2* | 10/2014 | Lu | ............... | G02B 6/3807 385/139 |
| 8,920,043 B2* | 12/2014 | Iwaya | ............... | G02B 6/3879 385/136 |
| 8,985,861 B2* | 3/2015 | Kahle | ............... | G02B 6/3825 385/58 |
| 2003/0147597 A1* | 8/2003 | Duran | ............... | G02B 6/3825 385/76 |
| 2004/0062486 A1* | 4/2004 | Tanaka | ............... | G02B 6/3825 385/55 |
| 2004/0171283 A1* | 9/2004 | Ngo | ............... | G02B 6/3849 439/55 |
| 2004/0223701 A1* | 11/2004 | Tanaka | ............... | G02B 6/3825 385/55 |
| 2008/0013148 A1* | 1/2008 | Katagiyama | ............... | G02B 6/3813 359/227 |
| 2011/0274437 A1* | 11/2011 | Jones | ............... | G02B 6/3895 398/141 |
| 2012/0033918 A1 | 2/2012 | Jibiki et al. | | |
| 2013/0011102 A1* | 1/2013 | Rinzler | ............... | G02B 6/4296 385/89 |
| 2013/0084041 A1* | 4/2013 | Lin | ............... | G02B 6/3825 385/56 |
| 2013/0195405 A1* | 8/2013 | Sanders | ............... | G02B 6/3825 385/56 |
| 2013/0302004 A1 | 11/2013 | Lin et al. | | |
| 2014/0133807 A1* | 5/2014 | Katoh | ............... | G02B 6/3821 385/78 |
| 2014/0147082 A1* | 5/2014 | Lee | ............... | G02B 6/3825 385/78 |
| 2015/0093076 A1 | 4/2015 | Tanaka et al. | | |

FOREIGN PATENT DOCUMENTS

| | | |
|---|---|---|
| JP | 5138005 B2 | 2/2013 |
| JP | 2013-235229 A | 11/2013 |
| JP | 2014-2256 A | 1/2014 |

* cited by examiner

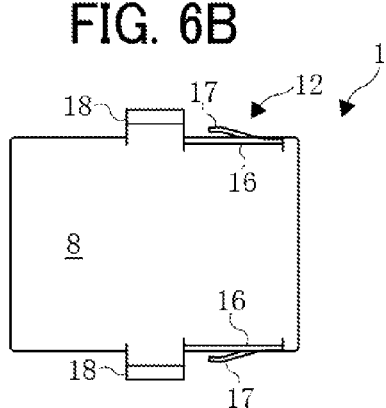
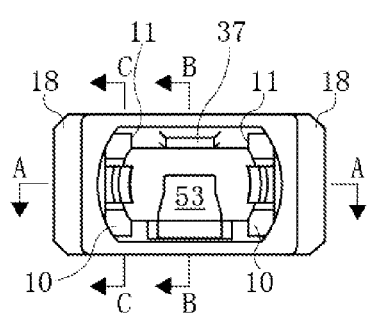 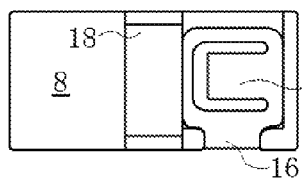 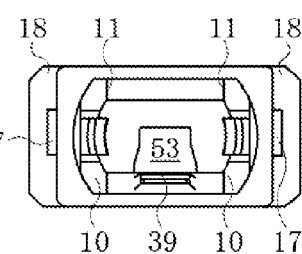
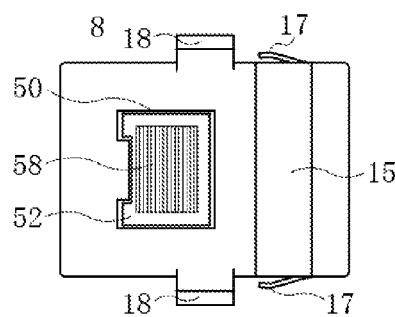

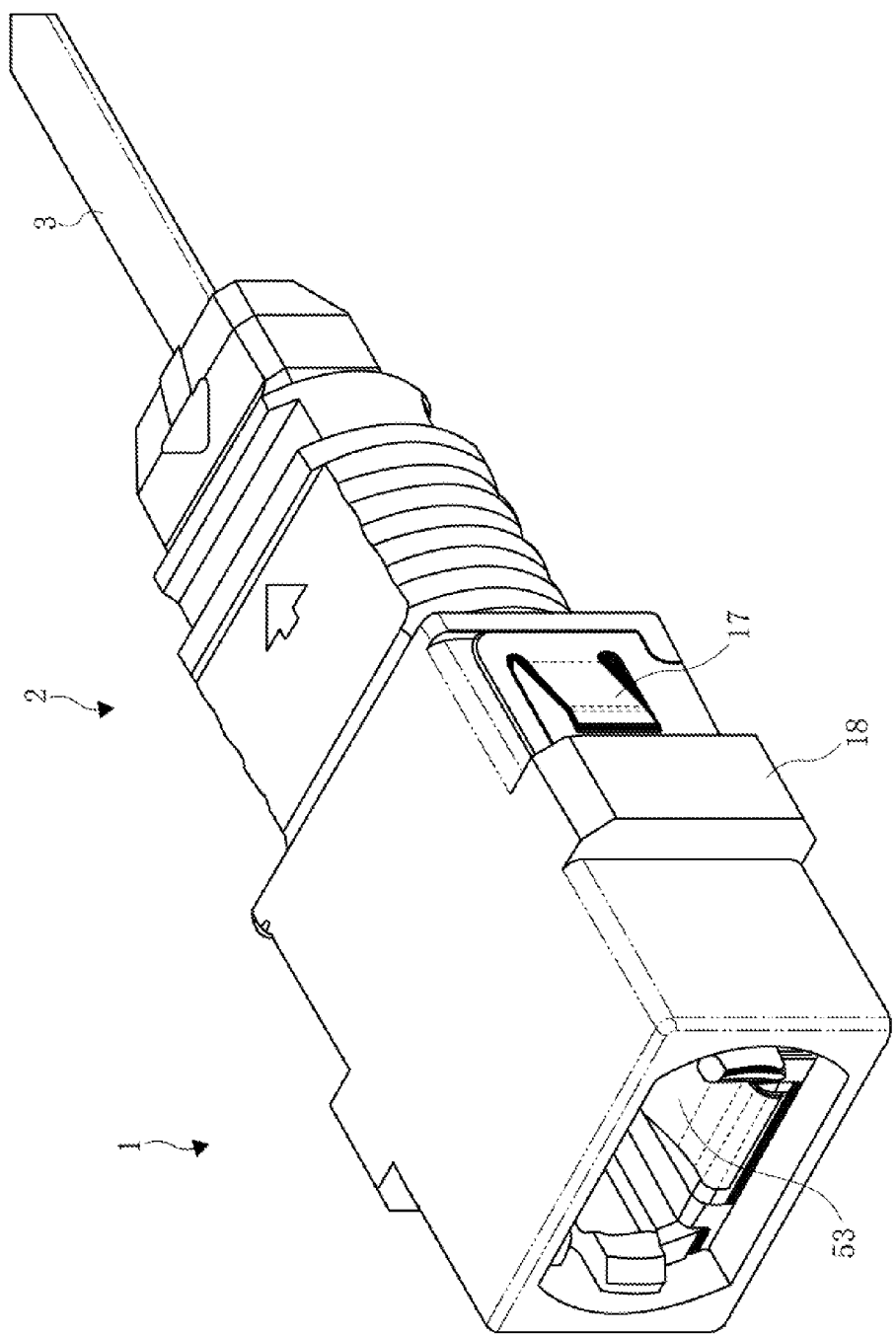

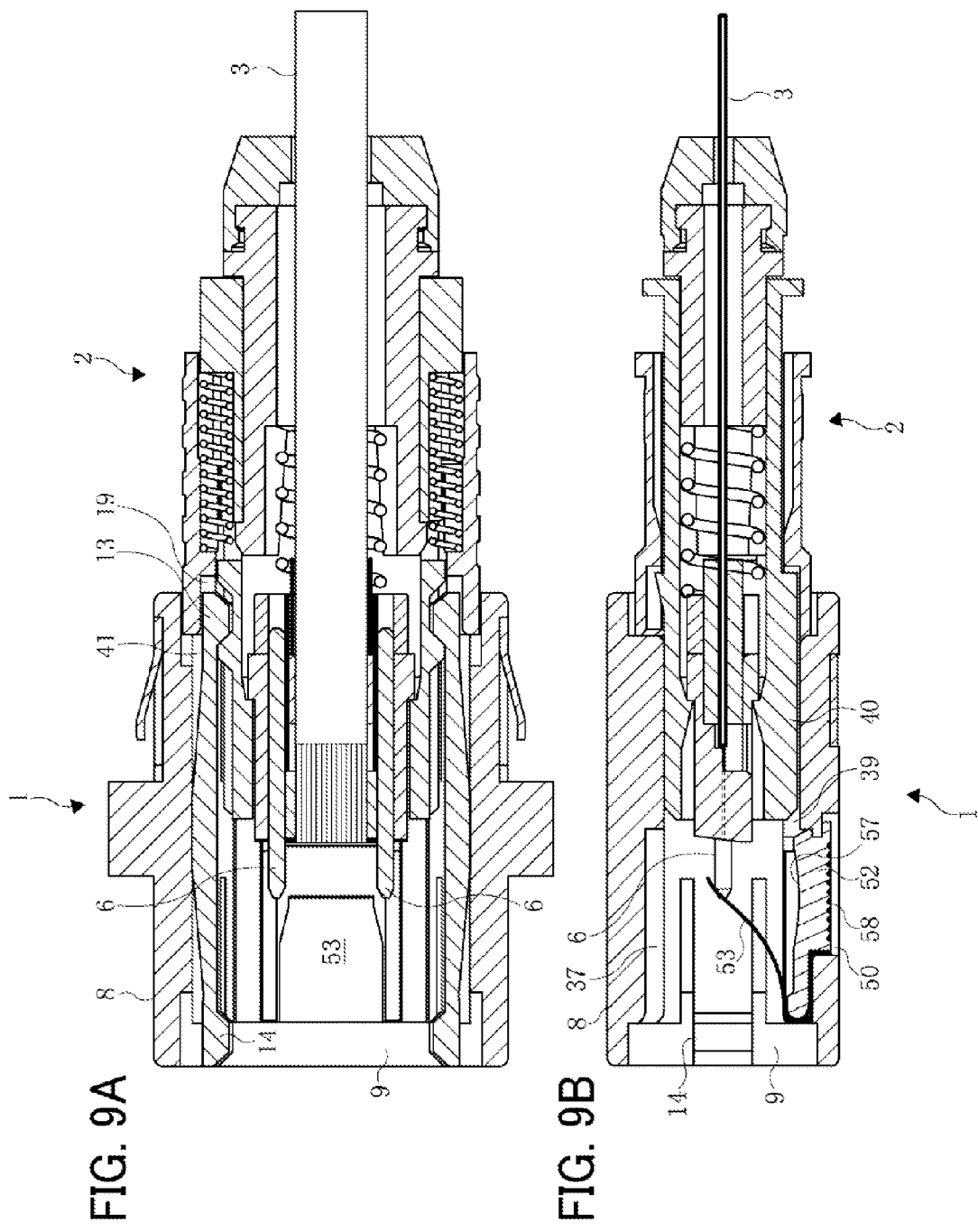

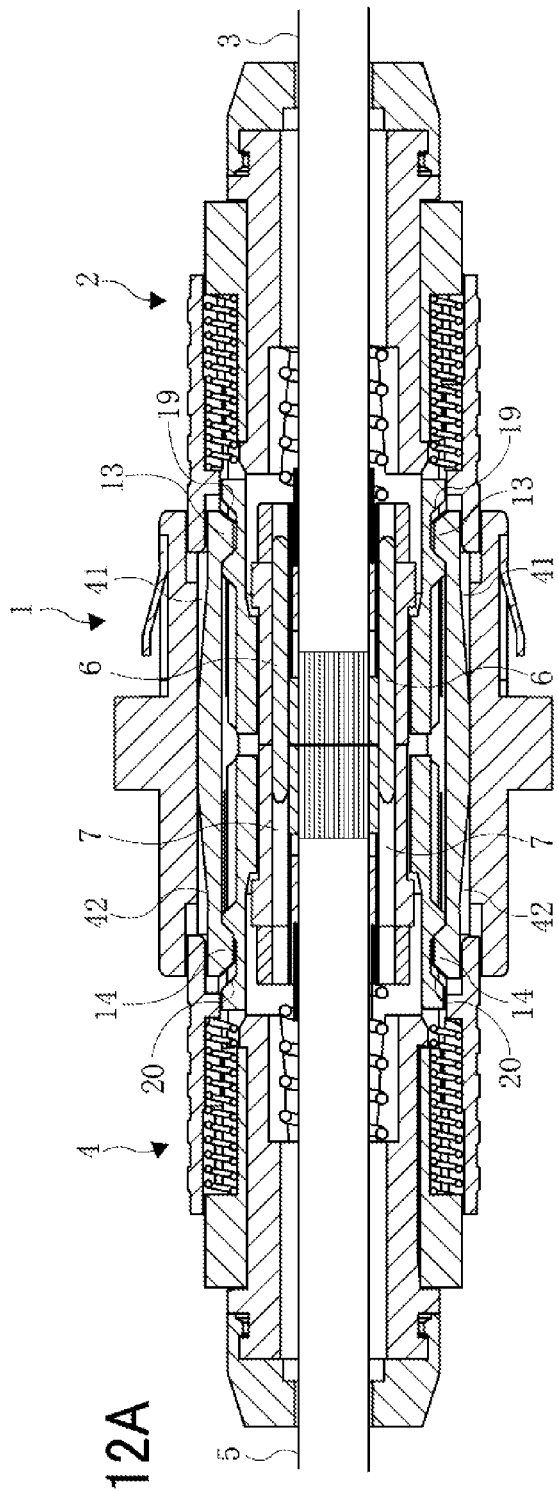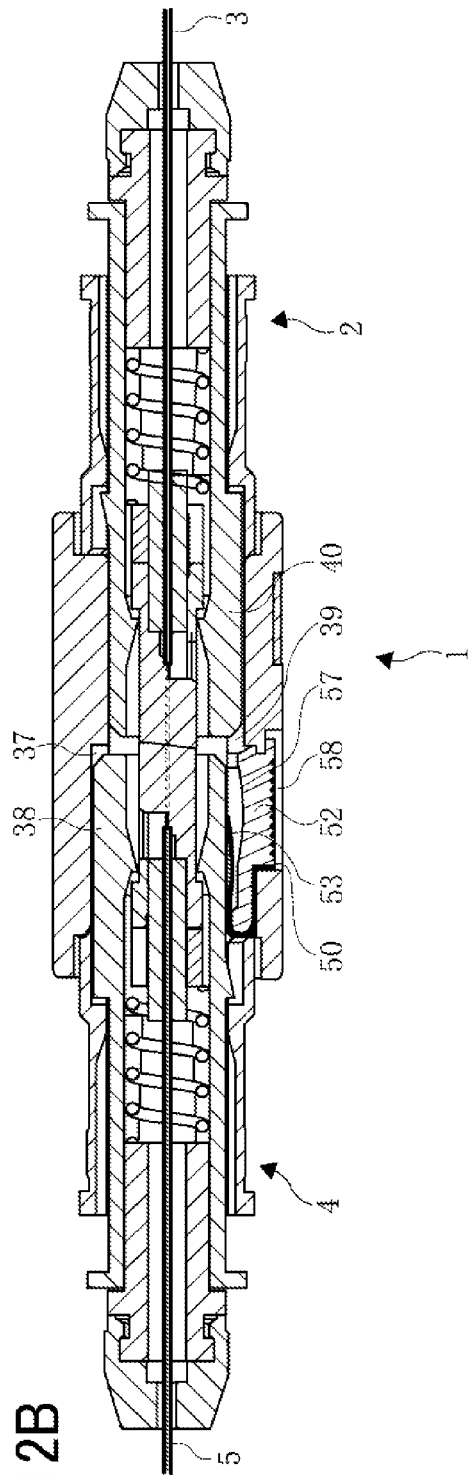
FIG. 12A
FIG. 12B

OPTICAL CONNECTOR ASSEMBLY AND OPTICAL CONNECTOR ADAPTER WITH SHUTTER

This patent application is based on and claims priority pursuant to 35 U.S.C. §119(a) to Japanese Patent Application Nos. 2014-177983, 2014-177984, and 2015-111993, filed on Sep. 2, 2014, Sep. 2, 2014, and Jun. 2, 2015, respectively, in the Japan Patent Office, the entire disclosures of which are hereby incorporated by reference herein.

BACKGROUND OF THE INVENTION

1. Field of the Invention

The present invention relates to an optical connector adapter with a shutter, which connects an optical fiber attached to an optical connector plug (hereinafter simply referred to as a first optical connector plug) with an optical fiber attached to the other optical connector plug (hereinafter simply referred to as a second optical connector plug). The present invention also relates to an optical connector assembly in which an optical connector plug is fitted into the optical connector adapter with a shutter.

2. Discussion of the Background

In typical optical communications, an optical connector is generally utilized to connect multiple optical fibers with each other. The optical connector is composed of a first optical connector plug that holds a tip of an optical fiber, a second optical connector plug that also holds a tip of another optical fiber, and a cylindrical optical connector adapter into which both the first and second optical connector plugs are inserted while facing each other. Since both the first and second optical connector plugs are inserted into the optical connector adapter while facing each other, the optical fiber of the first optical connector plug and that of the second optical connector plug are optically connected to each other.

As described with reference to FIGS. 8, 9, and 10 in a first patent literature (Japanese Patent Application Registration No. 5,138,005 (JP-5,138,005-B)), in a body of an known optical connector adapter that accommodates a shutter, a receiving hole is formed to penetrate the body of the optical connector adapter and accept insertion and removal of a first optical connector plug at one side thereof and insertion and removal of a second optical connector plug at the other side thereof as well. In the receiving hole of the known optical connector adapter with the shutter, an inclined shutter plate is installed extending in a prescribed direction therein. When the first optical connector plug is inserted into the receiving hole from one side of the optical connector adapter with the shutter, since light having optical high power outputted from a tip of the optical fiber of the first optical connector plug is blocked by the shutter plate, eyes of an operator are protected. When a second optical connector plug is inserted into the receiving hole from the other side thereof, the optical fiber of the first optical connector plug and that of the second optical connector plug are optically connected to each other after the shutter plate is pushed down by the second optical connector plug.

As also described with reference to FIG. 2 in a second patent literature (Japanese Patent Application Publication No. 2013-235229 (JP-2013-235229-A)), another known optical connector adapter includes outer and inner cylindrical housings. That is, the outer and inner cylindrical housings are each divided into two pieces at a center in a longitudinal direction thereof, respectively. One of segments of the inner cylindrical housing is inserted into one of segments of the outer cylindrical housing, while the other one of segments of the inner cylindrical housing is inserted into the other one of segments of the outer cylindrical housing again. The segments of the outer cylindrical housing are then connected to each other. In one of the segments of the inner cylindrical housing of this known optical connector adapter, a pair of first latches is disposed at a prescribed interval in its widthwise direction to engage with and disengage from side portions of a first optical connector plug, respectively. The pair of first latches is connected via upper and bottom wall portions of the inner cylindrical housing. Similarly, in the other one of segments of the inner cylindrical housing of this known optical connector adapter, a pair of second latches is also formed at a prescribed interval in its widthwise direction to engage with and disengage from side portions of a second optical connector plug, respectively. The pair of second latches is connected via upper and bottom wall portions again.

As also described with reference to FIGS. 4 and 5 in a third patent literature (Chinese Patent Application Publication No. 102,645,710 (CN-102,645,710-A)), yet another known optical connector adapter includes a cylindrical inner housing inserted into an outer cylindrical housing in a prescribed direction to be secured thereto. In one of opening sections of the inner cylindrical housing of this known optical connector adapter, a pair of first latches is formed at a prescribed interval in its widthwise direction to engage with and disengage from side portions of a first optical connector plug, respectively. In the other one of opening sections of the inner cylindrical housing of this known optical connector adapter, a pair of second latches is formed again at a prescribed interval in its widthwise direction to engage with and disengage from side portions of a second optical connector plug, respectively. The pairs of first and second latches are each connected via upper and bottom wall portions again. The inner cylindrical housing includes a fixed latch formed at its center to engage with the outer cylindrical housing to be secured thereto.

According to the known optical connector adapter the with shutter of the first patent literature (JP-5,138,005-B), light having optical high power outputted from the tip of the optical fiber hits the shutter plate and is thereby blocked as shown in FIGS. 8 to 10 of the first patent literature (JP-5,138,005-B). However, due to hitting the shutter plate, the light having optical high power is reflected by the shutter plate and illuminates a side wall of a plug insertion through hole. Since the light having optical high power outputted to the side wall of the plug insertion through hole turns into (i.e., generates) heat, an adapter body with the plug insertion through hole is accordingly heated consequently. Hence, when the known optical connector adapter is used over relatively the long time, the adapter body generally causes thermal degradation and/or thermal deformation or the like, thereby possibly raising a problem. At the same time, an optical connector plug also similarly causes thermal degradation and/or thermal deformation as well due to generated heat, thereby possibly raising a problem again.

In particular, since power of light having optical high power transmitted from an optical fiber tends to increase in recent years, an optical system capable of emitting high power laser having optical power greater than 0.1 W has been introduced. In the future, an optical communications system that emits optical power greater than 0.5 W is supposed to come into practical use. In addition, an optical connector that holds an optical fiber ribbon (e.g., a four-core wire, an eight-core wire, and a twelve-core wire) obtained by juxtaposing multiple optical fibers is increasingly spreading recently. For this reason, light beams having optical high power outputted from tips of these optical fibers and reflected by the shutter plate irradiate the side wall of the plug insertion through hole, thereby likely heating up the adapter body. When it is heated up, the adapter body generates thermal deformation thereby possibly disturbing insertion and removal of the first and second optical connector plugs. At the same time, material that constitutes the optical connector adapter with the shutter may output volatile substance that pollutes the first and second optical connector plugs. Furthermore, since it is heated, the optical connector plug may cause heat deformation again.

Recently, a prescribed optical connector adapter with the shutter circulates on the market, which attempts to prevent an adapter body from the thermal deformation and thermal degradation by employing metal in producing the adaptor body. In such an optical connector adapter with the shutter, however, since temperature of the adapter body rises as a whole, an operator is possibly thermally injured when he or she touches an end face of the optical connector adapter with the shutter.

In the optical connector adapter of the second patent literature (JP-2013-235229-A), since the pair of first latches separated at a prescribed interval in the widthwise direction of the inner cylindrical housing is connected to each other via the upper and bottom walls, and one of segments of the inner cylindrical housing has a cylindrical shape as shown in FIG. 2 of the second patent literature (JP-2013-235229-A), while the pair of second latches is similarly connected to each other via the upper and bottom walls, and the other one of segments of the inner cylindrical housing has a cylindrical shape again, when a through section is formed to penetrate the optical connector adapter from the receiving hole, into and from which the first optical connector plug is inserted and removed, to an outside of the optical connector adapter, multiple through sections are needed in both parts (i.e., one of the segments of the outer cylindrical housing and one of the segments of the inner cylindrical housing), respectively. Further, since upper and bottom walls of one of the segments of the inner cylindrical housing needs to be left unoccupied, a position and a size of an available through section are limited.

Similarly, as described with reference to FIGS. 3, 4, and 5 in the third patent literature (CN-102,645,710-A), in the optical connector adapter, since the pair of first latches separated at a prescribed interval in the widthwise direction of the inner cylindrical housing is connected to each other via the upper and bottom walls thereof again, while the pair of second latches is also connected to each other via the upper and bottom walls of the inner cylindrical housing as well so that the inner cylindrical housing has a cylindrical shape again, when a through section is formed to penetrate the optical connector adapter from the receiving hole, into and from which the first optical connector plug is inserted and removed, to an outside of the optical connector adapter, multiple through sections are also needed in both parts (i.e., the outer cylindrical housing and the inner cylindrical housing), respectively. Further, since upper and under walls of one of the segments of the inner cylindrical housing needs to be left unoccupied, a position and a size of an available through section are limited again.

In this respect, a developed optical connector adapter with a shutter capable of blocking light having optical high power outputted from an optical fiber and thereby suppressing a rise in temperature of an adapter body by using a countermeasure against the light having optical high power can be provided. Also provided is a development optical connector adapter with a shutter capable of employing a through section that penetrates the optical connector adapter from a receiving hole to an outside of the optical connector adapter regardless of location and size thereof.

Herein below, optical power greater than 0.1 W is simply referred to as high power. When an optical fiber ribbon is used and the sum of optical power outputted from multiple optical fibers thereof is 0.1 W or more, it is also simply referred to as the high power.

SUMMARY OF THE INVENTION

Accordingly, one aspect of the present invention provides a novel optical connector assembly that comprises: a first optical connector plug that holds an optical fiber; a second optical connector plug that holds an optical fiber; and an optical connector adapter that includes an adapter body. The adapter body includes: a first receiving hole to accept insertion and removal of the first optical connector plug that holds an optical fiber; a second receiving hole opposed to the first receiving hole to accept insertion and removal of a second optical connector plug that holds an optical fiber; a shutter plate located in one of the first and second receiving holes; and a countermeasure against light having optical high power that includes at least one of functions of heat radiation and optical radiation. The countermeasure against light having optical high power is provided in a side wall of one of the first and second receiving holes to receive light having optical high power outputted from the optical fiber held by the first optical connector plug toward the second receiving hole and reflected by the shutter plate. The countermeasure against light having optical high power controls temperature of the adapter body not to exceed a prescribed level when the light having optical high power is outputted from the optical fiber held by the first optical connector plug for about 15 minutes.

Another aspect of the present invention provides a novel optical connector adapter employed in the optical connector assembly.

Yet another aspect of the present invention provides a novel optical connector adapter that includes: an adapter body having a pair of receiving holes at its both ends, into and from which first and second optical connector plugs are inserted and removed in an opposite direction to the other, respectively; and a pair of latch members each having a first projecting portion to engage with and disengage from a side portion of the first optical connector plug and a second projecting portion to engage with and disengage from a side portion of the second optical connector plug. A pair of latch member engaging grooves is formed on an inner surface of the receiving hole at a prescribed interval in a widthwise direction of the adapter body, with which the pair of latch members engage, respectively. Each of the pair of latch members includes a stopper portion to determine a depth of insertion thereof and an engaging portion to hold itself at a prescribed insertion position. Each of the pair of latch member engaging grooves includes a step portion, with which the stopper portion of corresponding one of the pair of latch members engages, and an engaged portion, with which the engaging portion of the corresponding one of the pair of latch members engages. The first and second optical connector plugs are inserted into and removed from the receiving hole of the adapter body in an opposite direction to the other. The pair of latch members is inserted into the receiving hole from one side thereof opposed to the other side in which the engaged portion is located.

Advantage

According to one aspect of the present invention, an optical connector assembly and an optical connector adapter with a shutter can obtain the below described various advantages.

Firstly, since a countermeasure against light having optical high power is provided in at least a portion of a side wall of a second receiving hole, which is irradiated with light having optical high power outputted from an optical fiber held by a first optical connector plug toward a second receiving hole and reflected by a shutter plate disposed in the second receiving hole toward the side wall of the second receiving hole and accordingly temperature of the adapter body is controlled not to exceed a prescribed level even when the light having optical high power is outputted from the optical fiber held by the first optical connector plug for about 15 minutes, an operator likely does not have a risk of receiving a thermal injury by touching an end face of the optical connector assembly. Accordingly, the optical connector plug and the optical connector adapter with shutter likely do not cause heat deformation at the same time as well.

Secondly, since a pair of latch members is separately disposed omitting upper and bottom walls at both left and right sides of the receiving hole at a prescribed interval in a widthwise direction of the adapter body, greater flexibility in designing a location and a size of the through section can be obtained when compared with a conventional system, in which the pair of left and right latches is connected to each other via the upper and bottom wall portions to form the cylindrical shape. Accordingly, the optical connector adapter with the shutter having various effective high power countermeasure mechanisms can be accordingly obtained at the same time as well.

Thirdly, when compared with the conventional system, in which the pair of left and right latches is connected to each other via the upper and bottom wall portions to form the cylindrical shape, since the pair of latch members 10 is independently disposed from each other in the left and right sides according to one embodiment of the present invention, respectively, a shape of each of the pair of latch members can be more simplified and accordingly a molding process (e.g., an injection molding process, etc.) of molding the pair of latch members 10 can be more effectively facilitated.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6A is a side view illustrating assembly parts (i.e., the optical connector adapter with the shutter) that incorporates a pair of latch members, a window member, and a shutter plate or the like in the adapter body as shown in FIG. 2;

FIG. 6B is a plan view illustrating the assembly parts (i.e., the optical connector adapter with the shutter) that incorporates the pair of latch members, the window member, and the shutter plate or the like in the adapter body as shown in FIG. 2;

FIG. 6C is a bottom view illustrating the assembly parts (i.e., the optical connector adapter with the shutter) that incorporates the pair of latch members, the window member, and the shutter plate or the like in the adapter body as shown in FIG. 2;

FIG. 6D is a front view illustrating the assembly parts (i.e., the optical connector adapter with the shutter) that incorporates the pair of latch members, the window member, and the shutter plate or the like in the adapter body as shown in FIG. 2;

FIG. 6E is a rear view illustrating the assembly parts (i.e., the optical connector adapter with the shutter) that incorporates the pair of latch members, the window member, and the shutter plate or the like in the adapter body as shown in FIG. 2;

FIG. 8 is a perspective view illustrating an aspect when a first optical connector plug is inserted into the optical connector adapter with the shutter shown in FIG. 1;

FIG. 9A is a plan cross-sectional view illustrating the optical connector adapter with the shutter and the first optical connector plug as shown in FIG. 8;

FIG. 9B is a side cross-sectional view illustrating the optical connector adapter with the shutter and the first optical connector plug as shown in FIG. 8;

FIG. 12A is a horizontal cross-sectional view illustrating the optical connector adapter with the shutter and the first and second optical connector plugs as shown in FIG. 11, and FIG. 12B is a cross-sectional side view illustrating the optical connector adapter with the shutter and the first and second optical connector plugs as shown in FIG. 11.

DETAILED DESCRIPTION OF PREFERRED EMBODIMENTS

Referring now to the accompanying drawings, various preferred embodiments of the present invention are herein below described in detail, wherein the same reference numbers and marks are assigned to the same factors having virtually the same functionality and configuration throughout the entire specification and drawings to avoid duplicate descriptions. In the various embodiments, dimensions, materials, and other specific numerical values are employed for merely illustrative purpose in order to facilitate understanding of the present invention, and accordingly the present invention is not limited thereto unless otherwise particularly noted. Further, an element not directly related to the present invention is not illustrated herein below.

Initially, with reference to FIGS. 1 to 12B, an optical connector adapter with a shutter 1 is described according to a first embodiment of the present invention.

Figure 1:
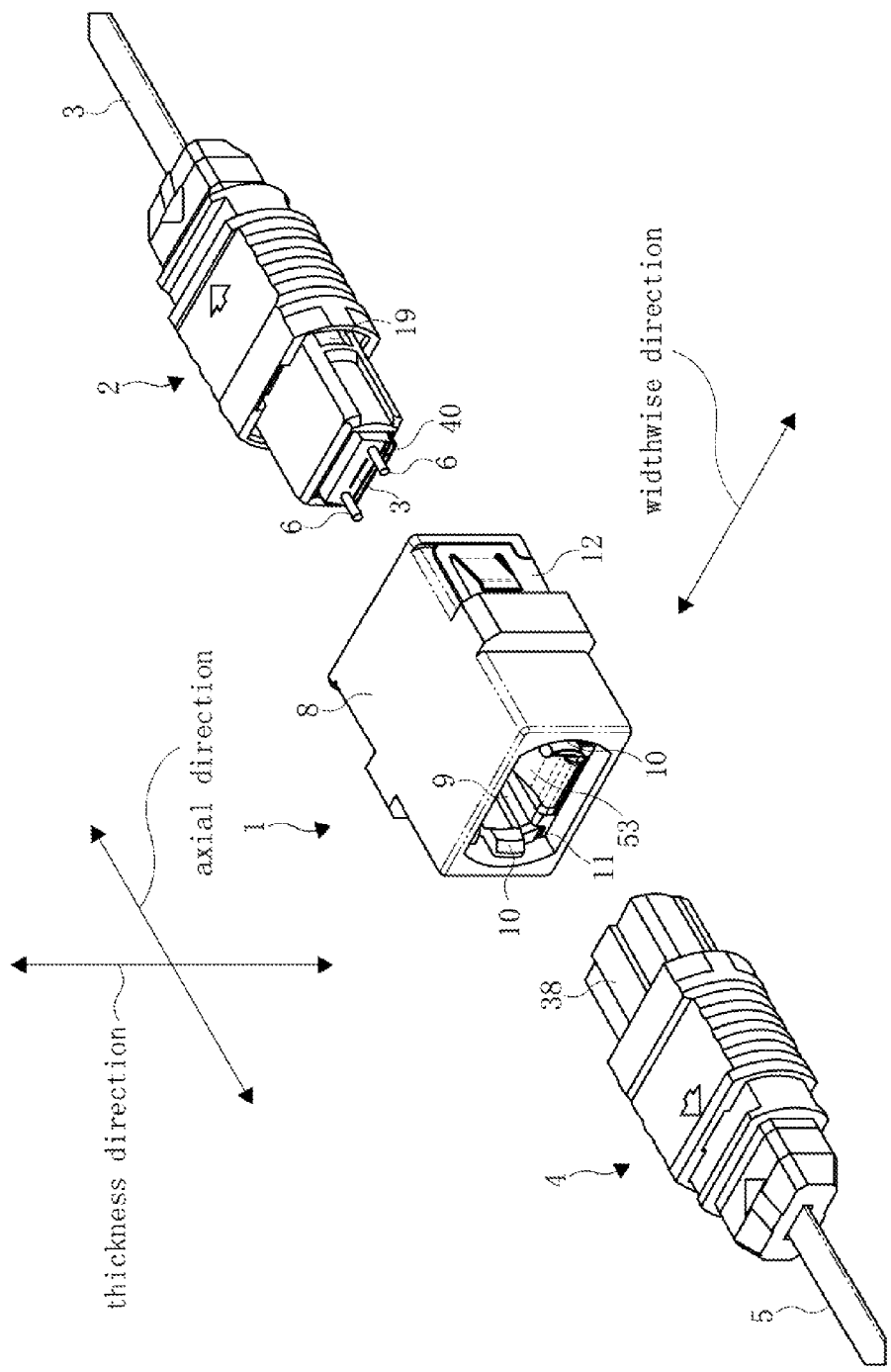
FIG. 1 is a perspective view illustrating an optical connector adapter with a shutter and first and second optical connector plugs inserted into and removed from the optical connector adapter with the shutter according to one embodiment of the present invention.
Figure 11:
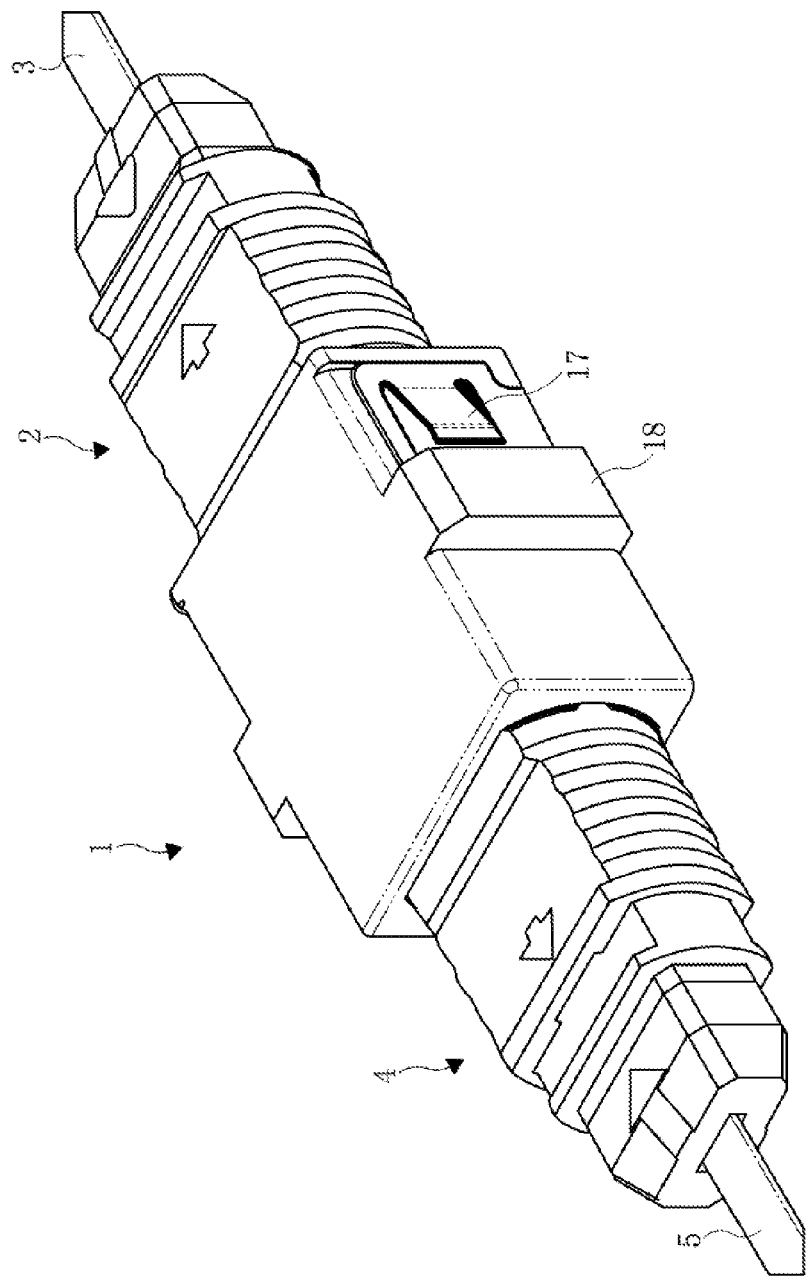
FIG. 11 is a perspective view illustrating an aspect when first and second optical connector plugs have been inserted into the optical connector adapter with the shutter as shown in FIG. 1.

As shown in FIGS. 1 and 11, the optical connector adapter with the shutter 1 according to the first embodiment of the present invention optically connects an optical fiber 3 held by a first optical connector plug 2 with an optical fiber 5 held by a second optical connector plug 4. The optical connector adapter with the shutter 1 conforms to JIS (Japanese Industry Standard) C 5964-7 (IEC 61754-7) (i.e., Optical fiber connector mating standard Part 7: MPO connector type (F13)). That is, according to the first embodiment of the present invention, the optical connector plugs can be inserted into and removed from the optical connector adapter with the shutter 1. More specifically, according to this embodiment, the first optical connector plug 2 is a male type (an M type). By contrast, the second optical connector plug 4 is a female type (an F type). However, the first and second optical connector plugs 2 and 4 can employ opposite types to the above-described male and female types, respectively, as well.

As shown again in FIGS. 1 and 12, the first optical connector plug 2 includes a pair of guide pins 6 at a prescribed interval in its widthwise direction. The second optical connector plug 4 correspondingly includes a pair of guide pin holes 7 into and from which the pair of guide pins 6 is inserted and removed, respectively. The first optical connector plug 2 holds a multi-core optical fiber ribbon (e.g., a four-core optical fiber ribbon, an eight-core optical fiber ribbon, and a twelve-core optical fiber ribbon or the like) prepared by juxtaposing multiple optical fibers 3. Respective tips of the optical fibers 3 of the multi-core optical fiber ribbon are positioned between the pair of guide pins 6. Similarly, the second optical connector plug 4 also holds a multi-core optical fiber ribbon prepared by juxtaposing multiple optical fibers 5. Respective tips of the optical fibers 5 of the multi-core optical fiber ribbon are positioned between the pair of guide pin holes 7 as well. However, these first and second optical connector plugs 2 and 4 may each hold a single-core optical fiber ribbon, in which a single optical fiber is built in, rather than the above-described multi-core optical fiber ribbon as well.

Hence, when the first and second optical connector plugs 2 and 4 are inserted into the optical connector adapter with the shutter 1 to face each other as shown in FIG. 11, and subsequently the pair of pins 6 of the first optical connector plug 2 is accordingly inserted into the pair of guide pin holes 7 of the second optical connector plug 4, the tips of the optical fibers 3 of the multi-core optical fiber ribbon of the first optical connector plug 2 contact the respective tips of the optical fibers 5 of the multi-core optical fiber ribbon of the second optical connector plug 4 to face each other as shown in FIGS. 12A and 12B. Consequently, the optical fibers 3 of the first optical connector plug 2 and the optical fibers 5 of the second optical connector plug 4 are optically connected to each other, respectively.

Figure 2:
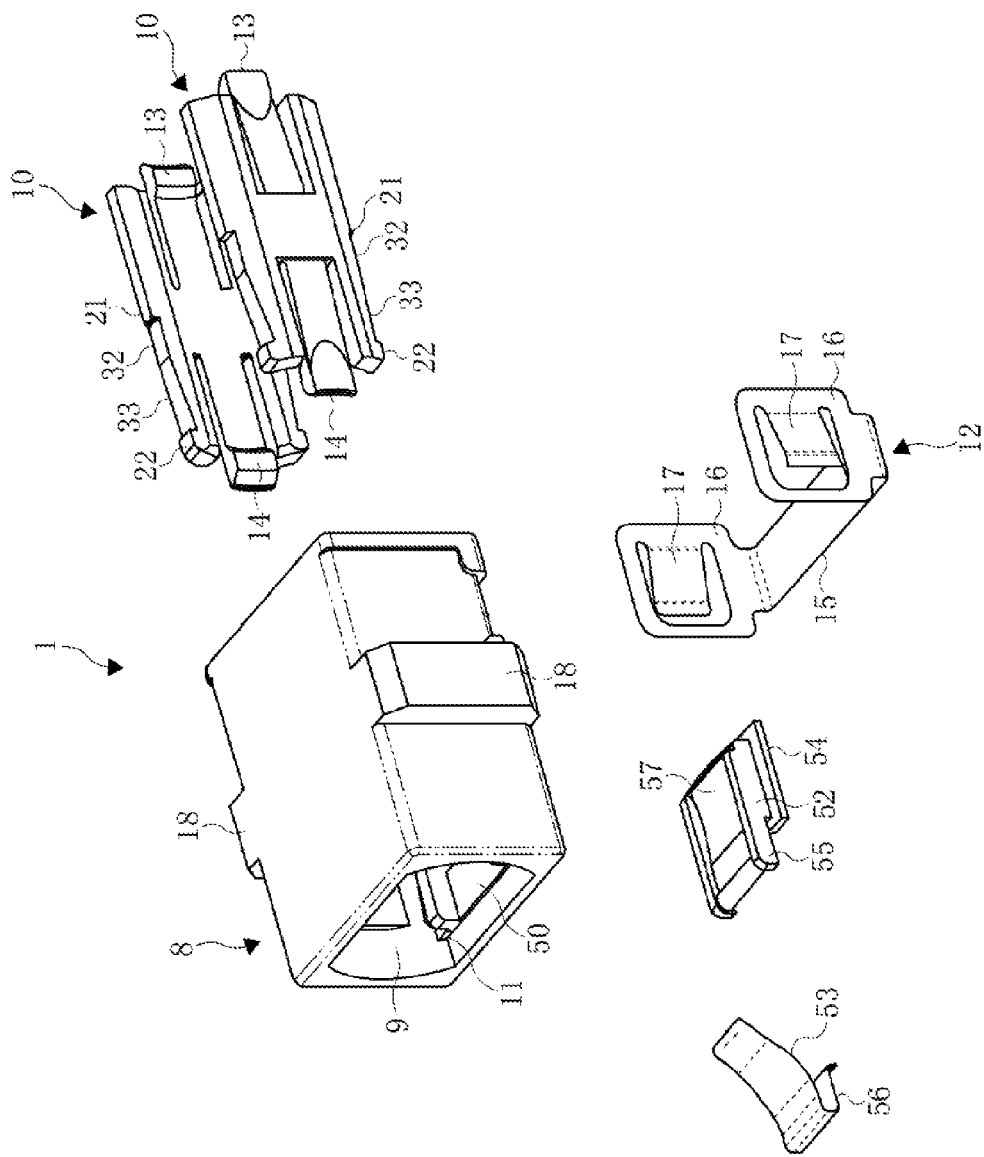
FIG. 2 is an exploded perspective view illustrating the optical connector adapter with the shutter shown in FIG. 1.

Further, as shown in FIGS. 1 and 2, the optical connector adapter with the shutter 1 according to this embodiment of the present invention has an approximately cuboid shaped adapter body 8 and includes a receiving hole 9 that penetrates the adapter body 8 and a pair of latch members 10 attached to an inner surface of the receiving hole 9 at a prescribed interval in a widthwise direction of the adapter body 8. The optical connector adapter with the shutter 1 according to this embodiment of the present invention also includes a pair of latch member engaging grooves 11 formed on the inner surface of the receiving hole 9 at a prescribed interval in the widthwise direction of the adapter body 8, a through section 50 formed on a bottom surface of the adapter body 8 in its thickness direction to communicate with the receiving hole 9, and a window member 52 attached to the through section 50. The optical connector adapter with the shutter 1 according to this embodiment of the present invention also includes a shutter plate 53 disposed in the receiving hole 9 and stopper metal parts 12 attached to an exterior surface of the adapter body 8.

As shown in FIG. 1, into and from the receiving hole 9, the first optical connector plug 2 is inserted and removed at one side thereof, and the second optical connector plug 4 is inserted and removed at another side thereof as well. As also shown in FIG. 2, in the pair of latch members 10, a pair of first projection portions 13 is formed to collectively engage with and disengage from both side portions of the first optical connector plug 2. A pair of second projecting portions 14 is also provided in the pair of latch members 10 to collectively engage with and disengage from both side portions of the second optical connector plug 4. To the pair of latch member engaging grooves 11, the pair of latch members 10 is attached, respectively. The shutter plate 53 is extended while inclining in a prescribed direction in the receiving hole 9 with it being sandwiched and supported between the adapter body 8 and the window member 52.

Figure 10:
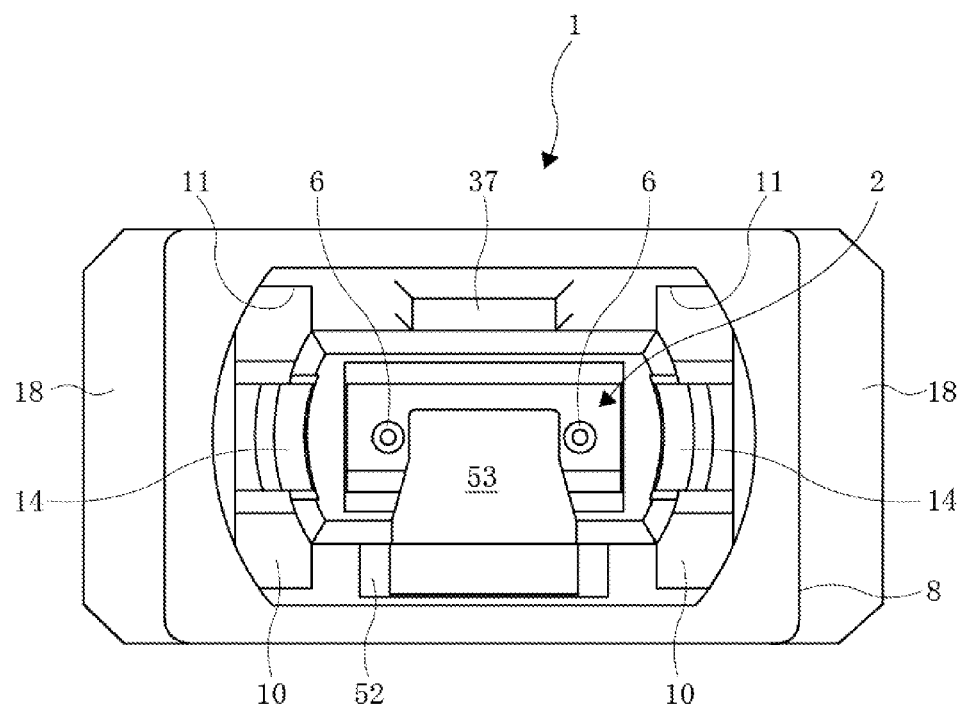
FIG. 10 is a front view illustrating the optical connector adapter with the shutter and the first optical connector plug as shown in FIG. 8.

More specifically, as shown in FIG. 8, the shutter plate 53 is positioned not to contact the first optical connector plug 2 inserted into the receiving hole 9 from one side thereof as shown in FIGS. 9 and 10. The shutter plate 53 is inclined as described in the above-described direction to reflect light having optical high power outputted from the optical fiber 3 of the first optical connector plug 2 in a prescribed direction toward the window member 52. By contrast, when the second optical connector plug 4 is inserted into the receiving hole 9 from the other side thereof as shown in FIG. 11, the shutter plate 53 is pushed down by the second optical connector plug 4 to lie along the window member 52 as shown in FIGS. 12A and 12B. With this, light having optical high power is outputted from the optical fiber held by the first optical connector plug toward the second receiving hole. The light having optical high power is then reflected by the above-described shutter plate placed in the second plug insertion ad removal hole and is further directed toward the side wall of the second receiving hole.

As shown in FIGS. 2 and 6, the stopper metal parts 12 include a bottom plate portion 15 contacting a bottom surface of the adapter body 8, a pair of side plate portions 16 to contact both sides of the adapter body 8, respectively, and a pair of stopper plates 17 prepared by cutting and erecting the pair of side plate portions, respectively. That is, the stopper metal parts 12 are prepared and produced by punching out a plate made of elastic material (e.g., a plate made of stainless steel, a plate made of copper alloy or the like) and bending it in a U-shaped state. In this embodiment, the stopper metal parts 12 are practically made of plate like stainless steel. Respective tips of the pair of stopper plates 17 face a pair of flanges 18 that protrudes sideward from the both sides of the adapter body 8. Hence, even not shown, when the optical connector adapter with the shutter 1 shown in FIG. 6B is pushed and inserted into a rectangular mounting hole formed on a panel placed on a right side of the drawing, the pair of stopper plates 107 disposed on the left and right sides of the optical connector adapter with the shutter 1 lie down. Then, the panel is supported at respective gaps formed between tips of the left and right stopper plates 17 and the flanges 18 as the left and right stopper plates 17 restore original positions due to elasticity.

Now, a pair of latch members 10 is herein below described in greater detail with reference to FIGS. 3A to 3F.

As shown there, each of pair of latch members 10 includes a first projecting portion 13 that engages with and disengages from a side portion of the first optical connector plug 2. The each of pair of latch members 10 also includes a second projecting portion 14 that engages with and disengages from a side portion of the second optical connector plug 4 as well. Hence, when the first and second optical connector plugs 2 and 4 are inserted into the optical connector adapter with the shutter 1 as shown in FIG. 11, the first projecting portion 13 engages with a concaved portion 19 formed in the side portion of the first optical connector plug 2 as shown in FIG. 12A. Similarly, the second projecting portion 14 engages with a concaved portion 20 formed in the side portion of the second optical connector plug 4 as well as shown in FIG. 12A.

As shown in FIG. 2, each of the pair of latch members 10 is inserted into the corresponding one of latch member engaging grooves 11 in a prescribed direction (i.e., from the right in FIG. 11). Each of the pair of latch members 10 includes a stopper portion 21 to determine an insertion depth thereof and an engaging portion 22 to maintain an insertion position thereof as shown in FIGS. 3A to 3F.

Figure 5A:
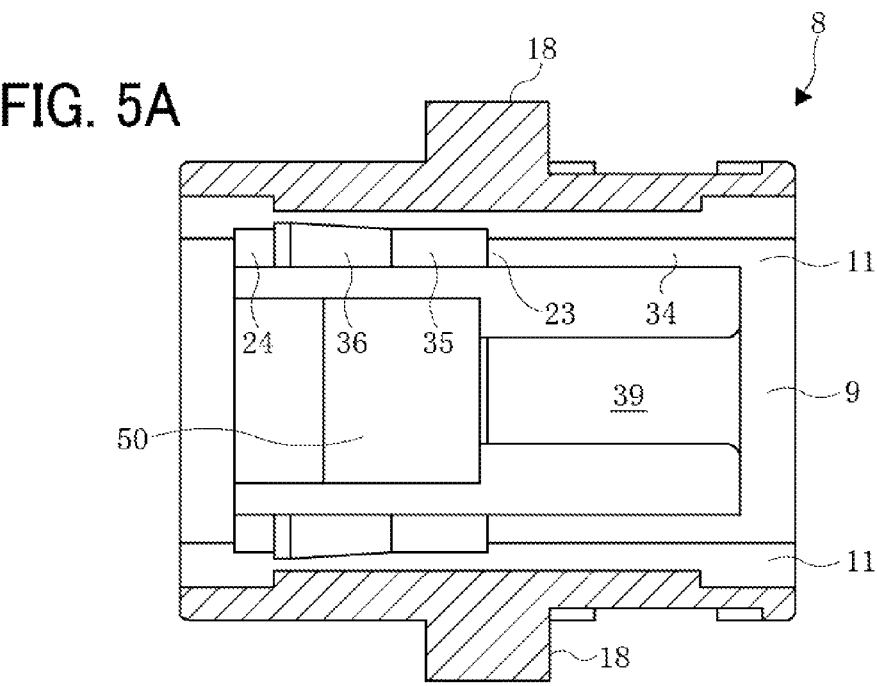
FIG. 5A is a cross-sectional view illustrating the adapter body taken along an A-A line as shown in FIG. 4D.
Figure 5B:
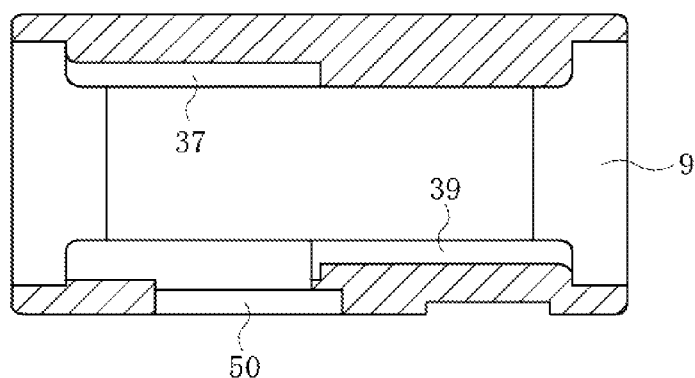
FIG. 5B is a cross-sectional view illustrating the adapter body taken along a B-B line in FIG. 4D.
Figure 5C:
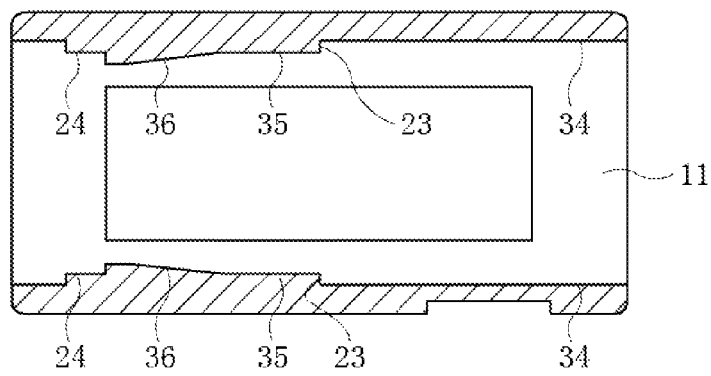
FIG. 5C is a cross-sectional view illustrating the adapter body taken along a C-C line in FIG. 4D.

As shown in FIG. 5C, the latch member engaging groove 11 includes a step 23 engaged by the stopper portion 21 of the latch member 10 and an engaged portion 24 engaged by the engaging portion 22 of the latch member 10.

As shown in FIGS. 3A to 3F, each of the latch members 10 includes a central portion 25, a first projection included cantilever 26 having a first projecting portion 13 at a tip thereof and extended from the central portion 25 in an direction parallel to the latch member engaging grooves 11. Each of the latch members 10 also includes a pair of guiding purpose cantilevers 27 extended in the axial direction from the central portion 25 and symmetrically arranged with the first projection included cantilever 26 in a direction of a thickness of the adapter body (i.e., perpendicular to the adapter body). Each of the latch members 10 also includes a pair of first slit sections 28 formed between one of the pair of guiding purpose cantilevers 27 and the first projection included cantilevers 26 and the other one of the pair of guiding purpose cantilevers 27 and the first projection included cantilevers 26, respectively.

Each of the latch members 10 further includes a second projection included cantilever 29 having a second projecting portion 14 at another tip thereof and extended from the central portion 25 in the axial direction.

Each of the latch members 10 further includes a pair of engaging portion included cantilevers 30 having an engaging portion 22 at a tip thereof and extended from the central portion 25 toward the other side in the axial direction. The pair of engaging portion included cantilevers 30 is symmetrically arranged with the second projection included cantilever 29 in a direction of a thickness of the adapter body 8 (i.e., perpendicular to the adapter body 8). Each of the latch members 10 further includes a pair of second slit sections 31 formed between one of the pair of engaging portion included cantilevers 30 and the second projection included cantilevers 29 and the other one of the pair of engaging portion included cantilevers 30 and the second projection included cantilevers 29, respectively.

Figure 3F:
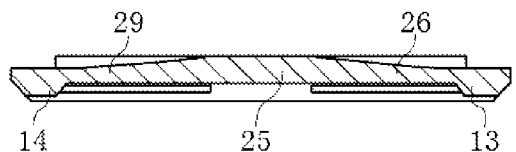
FIG. 3F is a cross-sectional view taken along a line f-f as shown in FIG. 3D.
Figure 3B:
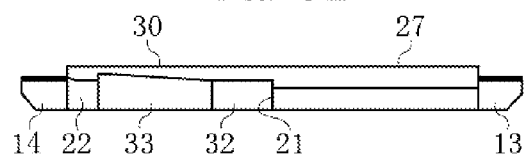
FIG. 3B is a plan view illustrating the one of a pair of latch members shown in FIG. 2.
Figure 3D:
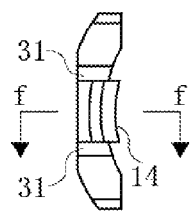
FIG. 3D is a front view illustrating the one of a pair of latch members shown in FIG. 2.
Figure 3A:
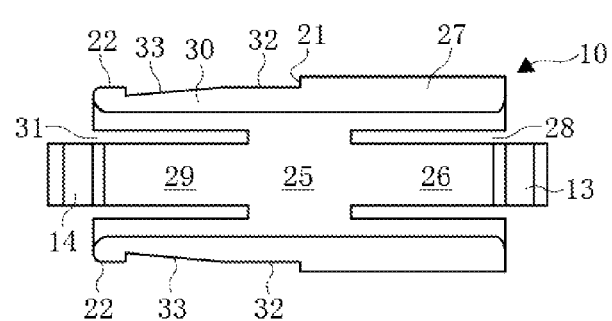
FIG. 3A is a side view typically illustrating one of a pair of latch members shown in FIG. 2.
Figure 3E:
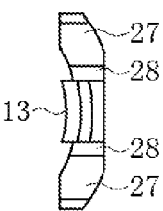
FIG. 3E is a rear view illustrating the one of a pair of latch members shown in FIG. 2.
Figure 3C:
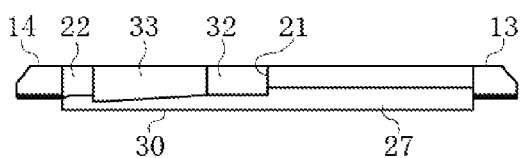
FIG. 3C is a bottom view illustrating the one of a pair of latch members shown in FIG. 2.
Figure 4B:
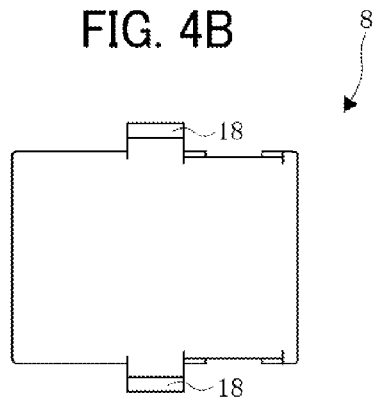
FIG. 4B is a plan view illustrating the adapter body shown in FIG. 2.
Figure 4D:
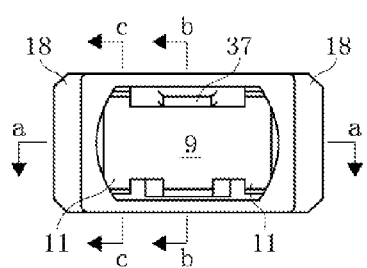
FIG. 4D is a front view illustrating the adapter body shown in FIG. 2.
Figure 4A:
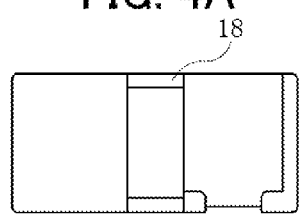
FIG. 4A is a side view illustrating an adapter body shown in FIG. 2.
Figure 4E:
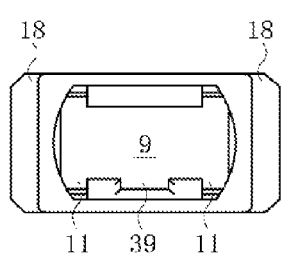
FIG. 4E is a rear view illustrating the adapter body shown in FIG. 2.
Figure 4C:
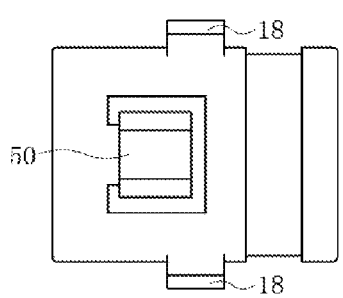
FIG. 4C is a bottom view illustrating the adapter body shown in FIG. 2.

With these configurations, due to a function of the first slit sections 28, the first projection included cantilever 26 as shown in FIG. 3A is allowed to deflect perpendicular to the adapter body 8 (i.e., its widthwise direction) when the first optical connector plug 2 shown in FIG. 1 is inserted into the receiving hole 9 as shown in FIG. 4E. Similarly, due to a function of the second slit sections 31, the second projection included cantilever 29 as shown in FIG. 3A is allowed to deflect perpendicular to the adapter body 8 (i.e., its widthwise direction) when the second optical connector plug 4 shown in FIG. 1 is inserted into the receiving hole 9 as shown in FIG. 4D.

At the same time, due to a function of the second slit section 31, the engaging portion included cantilever 30 is allowed to deform perpendicular to the adapter body 8 (i.e., its thickness direction) when the latch members 10 shown in FIG. 3A are inserted into the respective latch member engaging grooves 11 from the right side thereof as shown in FIG. 5C. Specifically, each of the second slit sections 31 has a function to enable each of the pair of engaging portion included cantilevers 30 and the second projection included cantilevers 29 to deform in directions of thickness and widthwise of the adapter body 8.

Further, as shown in FIG. 3A, in the engagement portion included cantilever 30 of each of the latch members 10, a horizontal portion 32 and a latch inclined portion 33 are formed. At a tip of the latch inclined portion 33, the engaging portion 22 is formed to protrude therefrom. An apex of the engaging portion 22 is set to be lower than the horizontal portion 32. Hence, when each of the latch members 10 is inserted into the corresponding latch member engaging groove 11, the apex of the engaging portion 22 can be prevented from being caught by an inner surface of the corresponding latch member engaging groove 11 as described later in detail.

Further, in the central portion 25 of each of the latch members 10, a stepwise stopper portion 21 is established to determine a depth of insertion thereof.

As shown in FIGS. 3A to 3F, the pair of latch members 10 has vertically symmetrical shapes in the thickness direction of the adapter body 8 with respect to its central axial parallel to the axes of the latch member engaging grooves 11. As a result, the pair of left and right latch members 10 attached to the inner surface of the receiving hole 9 at a prescribed interval in a widthwise direction of the adapter body 8 has the same shape. Accordingly, the pair of left and right latch member 10 can commonly use one parts number.

The pair of latch members 10 is prepared by using a plastic injection molding process. Material of the pair of latch members 10 is determined considering mechanical properties, cyclic deflection characteristics, and injection molding performance. Accordingly, resin, such as polybutylene terephthalate, polyamide plastic, polyethersulphone, polyether imide, polyphenylsulfone, etc., reinforced by glass fiber is suitable for the material of the pair of latch members 10. In this embodiment, the pair of latch members 10 is made of resin obtained by reinforcing polyamide resin with glass fiber.

Now, the pair of latch groove engaging grooves 11 is herein below described more in detail.

As shown in FIGS. 4D and 4E, in the inner surface of the receiving hole 9 formed to penetrate through the adapter body 8, the pair of latch member engaging grooves 11, into which the pair of latch members 10 is inserted, respectively, is formed at a prescribed interval therebetween in the widthwise direction of the adapter body 8. As shown in FIG. 5C, in each of the pair of the latch member engaging grooves 11, a first horizontal portion 34, a step portion 23, a second horizontal portion 35, a groove inclined portion 36, and an engaged portion 24 are disposed in this order from an entrance (i.e., on a right side in the drawing) toward a rear side (i.e., on a left side in the drawing). The pair of latch member engaging grooves 11 increasingly becomes narrower from the entrance toward the rear side, specifically, from the first horizontal portions 34 to the inclined portions 36 via the step portions 23 and the second horizontal portions 35 therebetween. The pair of latch member engaging grooves 11 is widened at the engaged portions 24 therebetween.

An interval between the latch member engaging grooves 11 in a vertical direction (i.e., the thickness direction of the adapter body 8) at the second horizontal portions 35 shown in FIG. 5C is determined in accordance with that between the pair of latch members 10 shown in FIG. 3A in the vertical direction at the horizontal portions 32 thereof. Accordingly, when the pair of the latch members 10 is inserted into the pair of latch member engaging grooves 11 with heights of the engaging portions 22 decreased to be less than the above-described horizontal portions 32 of the pair of latch members 10, respectively, the engaging portions 22 of the pair of latch members 10 can avoid from being caught by the second horizontal portions 35 of the pair of latch member engaging grooves 11, respectively.

When the pair of latch members 10 shown in FIG. 3A is pushed into the pair of latch member engaging grooves 11 shown in FIG. 5C, the engaging portions 22 of the pair of latch members 10 contact the inclined portions 36 of the pair of latch member engaging grooves 11, respectively.

Figure 7A:
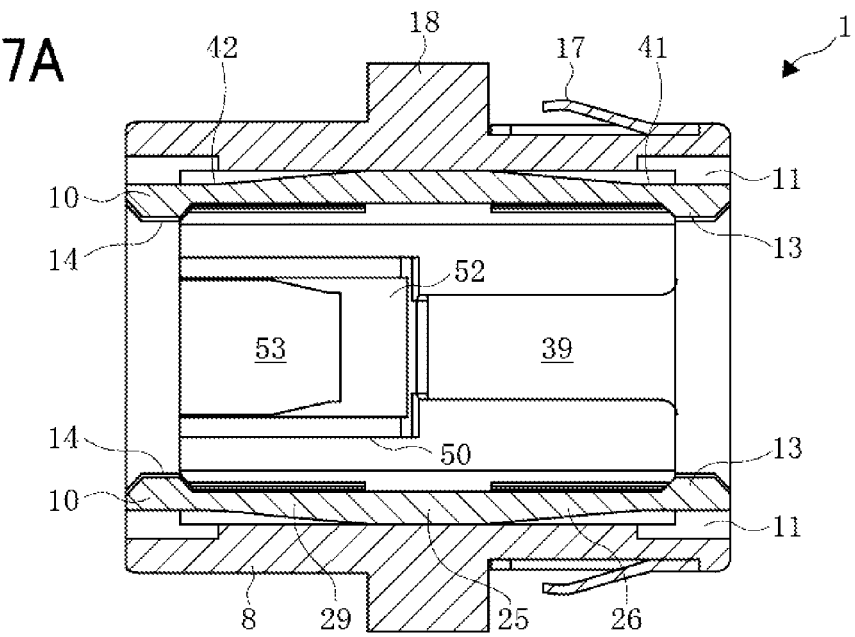
FIG. 7A is a cross-sectional view that illustrates the optical connector adapter with the shutter shown in FIGS. 6A to 6E, which is taken along an A-A line as shown in FIG. 6D.
Figure 7B:
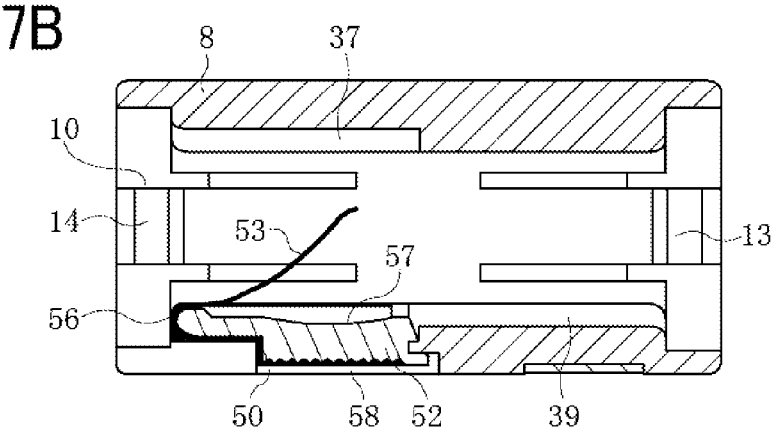
FIG. 7B is a cross-sectional view that illustrates the optical connector adapter with the shutter shown in FIGS. 6A to 6E, which is taken along a B-B line as shown in FIG. 6D.
Figure 7C:
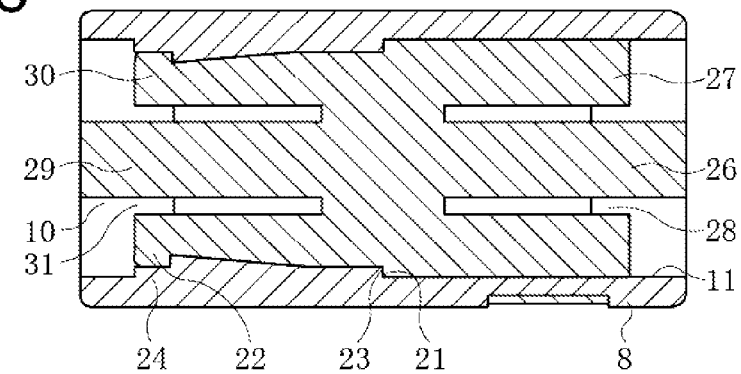
FIG. 7C is a cross-sectional view that illustrates the optical connector adapter with the shutter shown in FIGS. 6A to 6E, which is taken along a C-C line as shown in FIG. 6D.

As the pair of latch members 10 is further pushed into the pair of latch member engaging grooves 11 shown in FIG. 5C, the engaging portion included cantilevers 30 of the each of the pair of latch members 10 vertical deflect in the thickness direction of the adapter body 8. When the pair of engaging portions 22 of each of the pair of latch members 10 override the inclined portions 36, the engaging portion included cantilevers decrease a deflection amount, and the engaging portions 22 engage with the engaged portions 24 of each of the pair of latch member engaging grooves 11, respectively. Meanwhile, the stopper portions 21 of each of the pair of latch members 10 contact the step portions 23 of each of the pair of latch member engaging grooves 11, and accordingly the pair of latch members 10 is secured to the latch member engaging grooves 11 at prescribed positions, respectively, as shown in FIG. 7C.

Further, as shown in FIGS. 4D and 5B, a guide key groove 37 is formed on the inner surface of the receiving hole 9 near a widthwise center of the inner surface thereof. The guide key groove 37 engages with a guide key convex 38 formed in the second optical connector plug 4 as shown in FIGS. 1 and 12B. Similarly, as shown in FIGS. 4E and 5B, a guide key groove 39 is also formed on the inner surface of the receiving hole 9 at about a widthwise center thereof again. The guide key groove 39 engages with a guide key convex 40 formed in the first optical connector plug 2 as shown in FIGS. 1 and 12B.

Now, the adapter body 8 is herein below described more in detail with reference to FIGS. 6A to 7C and applicable drawings. That is, FIGS. 6A to 6E collectively illustrate the assembly (e.g., the optical connector adapter with the shutter 1), in which the pair of latch members 10 or the like is built in the adapter body 8. FIGS. 7A to 7C are cross-sectional views collectively illustrating the optical connector adapter with the shutter 1 shown in FIGS. 6A to 6E. As shown in FIG. 7A, a vacant space 41 is formed in the widthwise direction of the adapter body 8 between the first projection included cantilever 26 of the latch member 10 and the latch member engaging groove 11. Similarly, a vacant space 42 is also formed in the widthwise direction of the adapter body 8 between the second projection included cantilever 29 of the latch member 10 and the latch member engaging groove 11 as well.

Due to the former vacant space 41, when the first optical connector plug 2 is inserted into the receiving hole 9 and the side portion of the first optical connector plug 2 engages with the first projecting portion 13 of the first projection included cantilever 26, the first projection included cantilever 26 deflects outwardly in the widthwise direction of the adapter body 8 regarding a central portion 25 thereof as a deflection base point and allows the first optical connector plug 2 to further enter the receiving hole 9.

Similarly, due to the latter vacant space 42, when the second optical connector plug 4 is inserted into the receiving hole 9 and the side portion of the second optical connector plug 4 engages with the second projecting portion 14 of the second projection included cantilever 29, the second projection included cantilever 29 deflects outwardly in the widthwise direction of the adapter body 8 regarding the central portion 25 thereof as a deflection base point and allows the second optical connector plug 4 to further enter the receiving hole 9 as well.

Here, the adapter body 8 is prepared by using a plastic injection molding process. Material of the adapter body 8 is determined considering mechanical properties and injection molding performance. Hence, any one of resins of polybutylene-terephthalate, polyamide resin, polyphenylene sulfide, polyether sulphone, polyetherimide, and polyphenylsulfone reinforced by glass fiber is suitable for the material of the adapter body 8. Then, in this embodiment, the adapter body 8 is made of resin obtained by reinforcing polybutylene-terephthalate with glass fiber is utilized and is molded.

Now, the through section 50, the window member 52, and the shutter plate 53 are described in greater detail with reference to FIGS. 4 and 5 and applicable drawings. As shown in FIGS. 4 and 5, near a center of the bottom surface of the adapter body 8 in the thickness direction thereof, the through section 50 having a rectangular shape is formed to communicate with the receiving hole 9. As shown in FIG. 2, since the pair of latch members 10 is disposed from side to side in the widthwise direction of the adapter body 8 at a prescribed interval, the through section 50 does not interfere with the pair of latch members 10 and accordingly can be easily formed near the center of the bottom surface of the adapter body 8 in the thickness direction thereof. To the through section 50, the window member 52 is attached as shown in FIGS. 6 and 7. As a modification, the through section 50 may be formed on an upper surface of the adapter body 8 as well. Otherwise, multiple through sections 50 may be also formed both on the bottom and upper surfaces, respectively. That is, to these modified multiple through sections 50, multiple window members 52 are similarly attached, respectively, as well.

Hence, as shown in FIG. 2, the window member 52 is attached to the through section 50 and the shutter plate 53 is extended while tilting in a prescribed direction in the receiving hole 9 as well. The window member 52 includes a window mounting section 54 having a shape capable of fitting into the through section 50. The window member 52 also includes a shutter plate supporter 55 formed protruding from the window mounting section 54 in a prescribed direction. The shutter plate supporter 55 is combined with a shutter plate supported portion 56 having a cross section of a U-shape formed at one end of the shutter plate 53.

Here, the shutter plate 53 is prepared by punching it in a plate made of elastic material (e.g., steel, stainless steel, aluminum alloy, zinc alloy, copper alloy or the like) and bending it thereafter. In this embodiment, the shutter plate 53 is prepared by using the stainless steel plate.

The shutter plate 53 is disposed at a prescribed position as shown in FIGS. 9 and 10 not to contact the first optical connector plug 2 when the first optical connector plug 2 is inserted from one side of the receiving hole 9 as shown in FIG. 8. An inclination of the shutter plate 53 is set to a prescribed angle to reflect light having optical high power outputted from the optical fiber 3 of the first optical connector plug 2 toward the window member 52. Specifically, to accurately reflect the light having optical high power outputted from the optical fiber 3 toward the window member 52, a tip side of the shutter plate 53 that receives the light having optical high power from the optical fiber 3 inclines at an angle of from about 30 degrees to about 60 degrees. In particular, in this embodiment, the inclination angle of the tip side of the shutter plate 53 receiving light having optical high power from the optical fiber 3 is adjusted to fall within a range of from about 40 degrees to about 50 degrees. In addition, the shutter plate 53 is downwardly curved from the tip side toward the shutter plate supported portion 56 to form a downward convex thereby avoiding focusing of reflected light having optical high power therefrom.

Hence, when the second optical connector plug 4 is inserted into the receiving hole 9 from the other side thereof as shown in FIG. 11, the shutter plate 53 is pushed down by the second optical connector plug 4 to lie along the window member 52 as shown in FIGS. 12A and 12B. Further, as shown in FIG. 2, a recess 57 is formed in the window member 52 to accommodate the shutter plate 53 when the shutter plate 53 is pushed down as shown in FIG. 12B.

When the second optical connector plug 4 is pulled out from the receiving hole 9, the shutter plate 53 returns toward its original position due to its spring elasticity as shown in FIG. 9B. Hence, the light having optical high power outputted from the optical fiber 3 can be blocked by the shutter plate 53. The recess 57 formed in the window member 52 may have a shape capable of inhibiting the light reflected by the shutter plate 53 from going toward the first optical connector plug 2 while having optical high power. For example, to direct the light reflected by the recess 57 toward the shutter plate supported portion 56 (i.e., not toward the first optical connector plug 2), the recess 57 may have a saw-like cross section.

In this respect, the surface of the shutter plate 53 is made of material having metallic luster, such as gold, silver, etc., to reflect the light having optical high power outputted from the optical fiber 3. In addition, elastic material is utilized in the shutter plate 53 to enable the shutter plate 53 to lie down when the second optical connector plug 4 is inserted into the receiving hole 9 and recovers the original posture when the second optical connector plug 4 is withdrawn from the receiving hole 9. As such a material, plate like stainless steel or copper alloy is exemplified. Then, in this embodiment, the shutter plate 53 is prepared by using the stainless steel plate while maintaining luster of the stainless steel as is as described earlier.

Further, as shown in FIG. 7B, an uneven heat radiating section 58 is provided in a portion of the window member 52 exposed to the outside of the optical connector adapter with the shutter 1. In this embodiment, the uneven heat radiating section 58 is configured by parallel multiple mountains and valleys. Although the heat radiating section 58 includes parallel multiple mountains and valleys in this embodiment, it is not limited to such a shape and may include parallel multiple mountains and valleys having different parallelism therefrom by about 90 degrees, for example. The heat radiating section 58 may also include more than one needle-like projection or thin plate like multiple fins as well. These may project from the adapter body 8 in the thickness direction of the adapter body 8 as well.

The window member 52 is made of material having higher thermal conductivity than the adapter body 8. That is, as described earlier, as the material of the adapter body 8, any one of resins of polybutylene terephthalate, polyamide resin, polyphenylene sulfide, polyethersulfone, polyetherimide, and polyphenylsulfone reinforced by glass fiber is desirably utilized. All of these resins each have the thermal conductivity of about 0.5 W/m·K or less. By contrast, the window member 52 is made of metal, such as stainless steel, aluminum alloy, zinc alloy, copper alloys, etc., having higher thermal conductivity than the above-described resins. Otherwise, the window member 52 is made of high thermal conductive resin such as resin prepared by mixing nylon resin with heat conductive filler, etc. In this embodiment, the window member 52 is actually made of stainless steel having thermal conductivity of approximately 15 W/m·K.

Since the adapter body 8 is made of resin having thermal conductivity of about 0.5 W/m·K, heat generated in the window member 52 when it is irradiated and accordingly heated by the light having optical high power reflected by the shutter plate 53 can be inhibited to travel toward an end face of the adapter body 8, specifically, an opening of the receiving hole 9. Hence, temperature rarely rises at the end face of the adapter body 8, in which an opening of the receiving hole 9 is formed. Meanwhile, JIS (Japanese Industrial Standard) C 6950-1 and IEC (International Electrotechnical Commission) 60950-1 (i.e., Information technology equipment—Safety—Part 1: General requirements) provides a limit on contact temperature of an accessible portion of the equipment and permits temperature thereof up to either about 95 degrees Celsius or about 100 degrees Celsius.

In this respect, on the condition that the adapter body 8 is made of resin such as polybutylene terephthalate reinforced by glass fiber as described above in this embodiment, temperature of the end face of the adapter body 8, in which the opening of the receiving hole 9 is formed, is measured after optical power of from about 0.5 W to about 1 W is totally outputted from the first optical connector plug 2 for 15 minutes, and it has been confirmed as a result that the temperature does not exceed about 100 degrees Celsius.

That is, according to this embodiment of the present invention, because the adapter body includes the high power countermeasure mechanism, temperature can be suppressed from rising and exceeding 100 degrees Celsius by optimizing structure, material, and size or the like of the window member, even when optical radiation having high power greater than 1 W is output.

Further, the surface of the window member 52 has a lower light reflectivity than the surface of the adapter body 8. That is, since a wavelength of light used in optical communications executed by mainly using a single-mode optical fiber is in the vicinity of about 1.31 μm, the surface of the window member 52 is processed to decrease reflectivity of light at a wavelength of about 1.31 μm. For example, the surface of the window member 52 is subjected to a black oxide treatment. That is, in general, black color shows low light reflectivity when irradiated with visible light having a wavelength of from approximately 0.38 µm to approximately 0.78 µm. The black color also shows the low light reflectivity when irradiated with infrared light having a wavelength of about 1.31 µm as well. Accordingly, mat black treatment is applied to the surface of the window member 52 in this embodiment of the present invention. By blackening the surface of the window member 52, increasing in rate of heat radiation (i.e., an emissivity of infrared light) from the window member 52 toward the outside of the optical connector adapter with the shutter 1 can be expected at the same time as well.

Hence, as shown in FIGS. 6 and 7, according to one embodiment of the present invention, in the adapter body 8 of the optical connector adapter with the shutter 1, the through section 50 is provided to communicate with the receiving hole 9, the window member 52 is mounted on the through section 50, and the shutter plate 53 is supported by both the adapter body 8 and the window member 52. The inclination angle of the tip side of the shutter plate 53 is set to a prescribed level capable of directing the light having optical high power outputted from the optical fiber 3 toward the window member 52 as shown in FIG. 9B.

Accordingly, as shown in FIG. 8, when the first optical connector plug 2 is inserted into the receiving hole 9, the light having optical high power outputted from the first optical fiber 3 of the first optical connector plug 2 is reflected by the shutter plate 53 and is directed toward the window member 52 as shown in FIGS. 9B and 10. That is, the light having optical high power outputted from the optical fiber 3 can be blocked, and eyes of an operator can avoid from being exposed to the light having optical high power outputted from the optical fiber 3 as well. At the same time, heat generated in the window member 52 when heated by irradiation of the light can be radiated from the through section 50 toward the outside of the adapter body 8. Hence, staying of heat in the adapter body 8 can be suppressed accordingly.

Further, as shown in FIG. 7B, the uneven heat radiating section 58 is provided in a portion of the window member 52 exposed to the outside of the optical connector adapter with the shutter 1. Hence, as shown in FIG. 9B, when the first optical connector plug 2 is inserted into the receiving hole 9, and accordingly, the light having optical high power outputted from the optical fiber 3 of the first optical connector plug 2 is reflected by the shutter plate 53 and is directed toward the window member 52 thereby possibly heating the window member 52, the uneven heat radiating section 58 effectively radiates thermal heat of the window member 52 toward the outside of the adapter body 8. Accordingly, staying of heat in the adapter body 8 can be continuously suppressed over a long period of time.

Further, the window member 52 is made of material having higher thermal conductivity than the adapter body 8. Consequently, even when the light having optical high power outputted from the optical fiber 3 is reflected and directed by the shutter plate 53 toward the inner surface of the window member 52 (i.e., the surface of the recess 57) thereby heating the inner surface of the window member 52, heat of the inner surface of the window member 52 is promptly transmitted to the heat radiating section 58 located on an exterior surface of the window member 52, thereby capable of upgrading heat radiation performance. That is, the heat radiation performance is more effectively improved when compared with a system in which thermal conductivity of the window member 52 is equivalent to that of the adapter body 8. Hence, staying of heat in the adapter body 8 can be effectively suppressed again.

Further, since the adapter body 8 is made of resin having thermal conductivity of about 0.5 W/m·K or less, even when it is heated, transmission of heat from of the window member 52 toward the opening of the receiving hole 9 of the adapter body 8 located at its end face is inhibited. Hence, since temperature hardly rises at the opening located at the end face of the receiving hole 9 of the adapter body 8, an operator can avoid thermal injury even if he or she touches the end face of the optical connector adapter with the shutter 1.

Further, the surface of the window member 52 has a lower reflectivity of light than the surface of the adapter body 8. Consequently, the heat of the light having optical high power outputted from the optical fiber 3 and reflected by the shutter plate 53 thereafter can be accurately absorbed (i.e., heat absorption) by the window member 52, and can be effectively discharged toward the outside of the optical connector adapter with the shutter 1 through the through section 50. That is, when compared with a system in which reflectivity of light of the window member 52 is equivalent to that of the adapter body 8, since the window member 52 effectively improves the heat absorption but the adapter body 8 rarely does it, heat of the light having optical high power outputted from the optical fiber 3 can be effectively absorbed by the window member 52 rather than the adapter body 8 and is radiated toward the outside of the optical connector adapter with the shutter 1 through the through section 50. Hence, staying of heat in the adapter body 8 can be effectively suppressed again.

Further, the light receiving portion of the window member 52 (i.e., the portion of the window member 52 irradiated with light outputted from the optical fiber 3 and reflected by the shutter plate 53) may be made of either transparent or translucent material as a translucent portion having a total light transmittance of about 50% or more at a wavelength of 1.31 µm to release the light reflected by the shutter plate 53 toward the outside of the adapter body 8 through the translucent portion. That is, this system does not convert the outputted light into heat to be absorbed on the surface of the window member 52, but releases power of the light having optical high power toward the outside of the optical connector adapter with the shutter 1 while keeping a state of light. Since a function to release power (i.e., energy) of the light having optical high power outputted from the optical fiber 3 to an outside of the optical connector adapter with the shutter 1 is equivalent to that of the above-described embodiment, staying of heat in the adapter body 8 can be effectively suppressed again.

Also, because a direction of the light led from the translucent portion toward the outside of the optical connector adapter with the shutter 1 is perpendicular to the receiving hole 9 (i.e., a direction toward the through section 50), the light having optical high power does not enter eyes of an operator, and accordingly does not interfere his or her operation even when the operator accidentally peeps in the receiving hole 9. Such a translucent portion may be made of any one of polycarbonate, COC (Cyclo Olefin Copolymer), COP (Cyclo Olefin Polymer), polyarylate, polyetherimide, polysulfone, polyethersulfone, polyphenylsulfone, acrylic resin, silicone resin, and epoxy resin.

Further, an exterior surface of the above-described translucent portion (i.e., a surface thereof on the opposite side of the recess 57) disposed in the window member 52 can provide an light diffusion surface having an irregularity formed by using a frosted glass, a translucent figured glass, and a misty figured glass or the like. According to this system, since light led to the outside of the adapter body 8 through the translucent portion can be diffused and distributed by the light diffusion surface in various directions, power of the light affecting eyes of an operator can be minimized even if he or she looks at the light diffusion surface of the translucent portion (i.e., the through section 50). An inner surface of the translucent portion can also employ the above-described light diffusion system as well.

Further, since the pair of latch members 10 is separately disposed on the inner surface of the receiving hole 9 of the adapter body 8 in both left and right sides at the prescribed interval in the widthwise direction, the through section 50 that enables the receiving hole 9 to communicate with the outside of the optical connector adapter with the shutter 1 only needs to be employed in the adapter body 8. Furthermore, since the through section 50 does not interfere with the pair of latch members 10, a greater flexibility in designing a location and a size of the through section 50 can be obtained. Consequently, an optical connector adapter with the shutter 1 can effectively provide various high power countermeasure mechanisms.

Further, unlike the conventional system, in which the left and right latches are connected by the upper and bottom wall portions thereby forming the cylindrical shape, since the pair of latch members 10 is independently provided in the left and right sides from each other, respectively, a shape of each of the latch members 10 can be more simplified as shown in FIGS. 3A to 3F, thereby more effectively facilitating the molding process (e.g., the injection molding process or the like) of molding the latch member 10 as well.

That is, a metal mold with a cavity, to which a shape of a back side of the latch member 10 shown in FIG. 3A is transferred, and another metal mold with another cavity, to which a shape of a front side of the latch member 10 shown in FIG. 3A is transferred, are coupled together. Subsequently, molten resin is injected into the cavities accommodated in the metal molds. Then, the metal molds are opened, and a molded piece is taken out therefrom without being caught by the cavity. That is, the injection molding process of molding the molded piece, i.e., the latch member 10, can be easily and safely performed.

Further, as shown in FIG. 3A, the second slit section 31 is formed in the latch member 10 between the engaging portion included cantilever 30 and the second projection included cantilever 29. Hence, when the latch member 10 shown in FIG. 3A is inserted into the latch member engaging groove 11 as shown in FIG. 5C from the right side thereof, due to the second slit section 31, the engaging portion included cantilever 30 is allowed to deflect in the thickness direction of the adapter body 8. Further, when the second optical connector plug 4 shown in FIG. 1 is inserted into the receiving hole 9 shown in FIG. 4D, due to the second slit section 31, the second projection included cantilever 29 is allowed to deflect in the widthwise direction of the adapter body 8 as well.

In this way, since the second slit section 31 doubles a slit for allowing the engaging portion included cantilever 30 to deflect in the thickness direction of the adapter body 8 and that for allowing the second projection included cantilever 29 to deflect in the widthwise direction of the adapter body 8, the number of slits can be more effectively reduced than a system in which these slits are separately formed. Thus, the latch member 10 can be compact while maintaining a prescribed stiffness of the latch member 10 generally spoiled by formation of the slit.

Further, as shown in FIG. 7A, between the first projection included cantilever 26 of the latch member 10 and the latch member engaging groove 11, a vacant space 41 is formed in the widthwise direction of the adapter body 8. Similarly, between the second projection included cantilever 29 of the latch member 10 and the latch member engaging grooves 11, a vacant space 42 is also formed in the widthwise direction of the adapter body 8. Hence, due to the former vacant space 41, the first projection included cantilever 26 is allowed to outwardly deflect in the widthwise direction of the adapter body 8 to accept approach of the first optical connector plug 2 thereto. Similarly, due to the latter vacant space 42, the second projection included cantilever 29 is allowed to outwardly deflect in the widthwise direction of the adapter body 8 to accept approach of the second optical connector plug 2 thereto. Thus, the first and second optical connector plugs 2 and 4 can be smoothly inserted into the receiving hole 9.

Further, as shown in FIGS. 3A to 3F, each of the latch members 10 is molded to have a vertically symmetrical shape in the thickness direction of the adapter body 8 about a central axial parallel to an axial direction of each of the latch member engaging grooves 11.

With this, since the pair of latch members 10 mounted onto the inner surface of the receiving hole 9 at a prescribed interval in the widthwise direction of the adapter body 8 have horizontally the same shape in the left and right sides thereof, one item's stock number can be commonly used for the pair of latch members 10 located on the left and right sides, thereby promoting the cost reduction.

Hence, the various embodiment and modifications of the present invention can be utilized in an optical connector adapter with the shutter, which connects an optical fiber attached to a first optical connector plug with another optical fiber attached to a second optical connector plug.

Numerous additional modifications and variations are possible in light of the above teachings. It is therefore to be understood that within the scope of the appended claims, the disclosure of this patent specification may be practiced otherwise than as specifically described herein.

What is claimed is:

1. An optical connector adapter with a shutter employed in an optical connector assembly, the optical connector assembly comprising:
   the optical connector adapter having a first receiving hole and a second receiving hole opposed to the first receiving hole; and
   a first optical connector plug holding at least one optical fiber and inserted into the first receiving hole,
   wherein the optical connector adapter includes:
      an adapter body having the first receiving hole and the second receiving hole;
      a shutter plate disposed in the second receiving hole; and
      a countermeasure against optical high power for heat radiation or optical radiation,
   wherein when light having optical high power is outputted from said at least one optical fiber held by the first optical connector plug, the light having optical high power reflects at the shutter plate and is directed toward a side wall of the second receiving hole, and the countermeasure against optical high power is provided at a portion of the side wall of the second receiving hole to be irradiated with the reflected light, and
   wherein the countermeasure against optical high power includes:
      a through section penetrating the adapter body from the second receiving hole to outside of the adapter body; and
      a window member accommodated in the through section of the adapter body.

2. The optical connector assembly according to claim 1, wherein the countermeasure against optical high power is configured so that temperature of an end face of the second receiving hole shall not exceed 100 degrees Celsius after being irradiated with the light having optical high power for 15 minutes.

3. The optical connector adapter with a shutter according to claim 1, wherein the window member is made of material having higher thermal conductivity than that of the adapter body.

4. The optical connector adapter with a shutter according to claim 3, wherein the adapter body is made of thermoplastic resin having thermal conductivity of 0.5 W/m·K or less, and the window member is made of iron and steel, stainless steel, aluminum alloy, zinc alloy, or copper alloy.

5. The optical connector adapter with a shutter according to claim 4, wherein a surface of the window member either entirely or partially has a smaller optical reflectance than that of the adapter body at a wavelength of 1.31 μm.

6. The optical connector adapter with a shutter according to claim 4, wherein the surface of the window member either entirely or partially has a black color.

7. The optical connector adapter with a shutter according to claim 1, wherein the window member is made of plastic or glass.

8. The optical connector adapter with a shutter according to claim 7, wherein the window member has a total light transmittance of 50% or more at a wavelength of 1.31 μm.

9. The optical connector adapter with a shutter according to claim 7, wherein the window member is made of polycarbonate, COC (Cyclo Olefin Copolymer), COP (Cyclo Olefin Polymer), polyarylate, polyether imide, polysulfone, polyethersulfone, polyphenylsulfone, acrylic resin, silicone resin, or epoxy resin.

10. The optical connector adapter with a shutter according to claim 1, further comprising:
a pair of latch members each having a first projecting portion to engage with a side portion of the first optical connector plug at one end thereof and a second projecting portion to engage with a side portion of the second optical connector plug at the other end thereof; and
a pair of grooves for engaging the latch members formed on an inner surface of the receiving hole at a prescribed interval in a widthwise direction of the adapter body, respectively,
wherein each of the latch members includes a stopper portion and an engaging portion,
wherein each groove for the latch members includes a step portion which contacts the stopper portion, and an engaged portion which the engaging portion engages with,
wherein the latch members are inserted into the receiving hole from one side to the other side which the engaged portions are positioned.

11. The optical connector adapter with a shutter according to claim 10, wherein the adapter body is integrally molded.

12. The optical connector adapter with a shutter according to claim 10, wherein each of the pair of latch members includes:
a central portion;
a first cantilever extending to one side in the axial direction of the groove for engaging the latch member from the central portion and having the first projecting portion at a tip thereof;
a second cantilever extending to the other side in the axial direction of the groove for engaging the latch member from the central portion and having the second projecting portion at a tip thereof;
a pair of cantilevers for the engaging portions extending to the other side in the axial direction of the groove and locating symmetrically each other with respect to the second cantilever in the thickness direction of the adapter body and having the engaging portion at a tip thereof; and
a pair of slits, each slit formed between the second cantilever and the cantilever for the engaging portions.

13. The optical connector adapter with a shutter according to claim 12, wherein each latch member is vertically symmetrical in the thickness direction of the adapter body with respect to a central axis thereof parallel to the grooves for engaging the latch members.

14. A pair of latch members employed in an optical connector adapter the optical connector adapter comprising:
an adapter body having a first receiving hole and a second receiving hole opposed to the first receiving hole;
the pair of latch members each having a first projecting portion to engage with a side portion of a first optical connector plug at one end thereof and a second projecting portion to engage with a side portion of a second optical connector plug at the other end thereof and including a stopper portion and an engaging portion,
wherein a pair of grooves for engaging the latch members is formed on an inner surface of the receiving hole at a prescribed interval in a widthwise direction of the adapter body, respectively, each including a step portion which contacts the stopper portion and an engaged portion which the engaging portion engages with,
wherein the latch members are inserted into the receiving hole from one side to the other side which the engaged portions are positioned, each latch member comprising:
a central portion;
a first cantilever extending to one side in the axial direction of the groove for engaging the latch member from the central portion and having a first projecting portion at a tip thereof;
a second cantilever extending to the other side in the axial direction of the groove for engaging the latch member from the central portion and having a second projecting portion at a tip thereof;
a pair of cantilevers for the engaging portions extending to the other side in the axial direction of the groove and locating symmetrically each other with respect to the second cantilever in the thickness direction of the adapter body and having the engaging portion at a tip thereof; and
a pair of slits, each slit formed between the second cantilever and the cantilever for the engaging portions.

15. The pair of latch members according to claim 14, wherein each latch member is vertically symmetrical in the thickness direction of the adapter body with respect to a central axis thereof parallel to the grooves for engaging the latch members.

* * * * *